United States Patent
Matsunaga et al.

(10) Patent No.: US 6,624,713 B2
(45) Date of Patent: Sep. 23, 2003

(54) MAGNETIC MATERIAL FOR HIGH FREQUENCIES AND HIGH-FREQUENCY CIRCUIT COMPONENT

(75) Inventors: Tatsuya Matsunaga, Yasu-gun (JP); Hiroshi Marusawa, Moriyama (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 0 days.

(21) Appl. No.: 09/931,495

(22) Filed: Aug. 16, 2001

(65) Prior Publication Data

US 2002/0039555 A1 Apr. 4, 2002

(30) Foreign Application Priority Data

Aug. 18, 2000 (JP) .................................. 2000-248441

(51) Int. Cl.$^7$ .............................................. H01P 1/383
(52) U.S. Cl. ..................................... 333/1.1; 252/62.57
(58) Field of Search .................... 333/1.1, 24.2; 252/62.57, 62.59

(56) References Cited

U.S. PATENT DOCUMENTS 5,709,811 A * 1/1998 Satoh et al. ............. 252/62.57
5,745,015 A * 4/1998 Tokudera et al. ............ 333/1.1

FOREIGN PATENT DOCUMENTS

| EP | 0635854 A1 | 1/1995 | ............. H01F/1/34 |
|----|------------|--------|------------------------|
| EP | 0635855 A1 | 1/1995 | ............. H01F/1/34 |
| GB | 1242514 | 8/1971 | ............ C04B/35/00 |
| JP | 6-61708 | 3/1994 | ............ H01P/1/383 |
| JP | 7-212108 | 8/1995 | ............ H01P/1/383 |
| JP | 9-171918 | 6/1997 | |
| JP | 11-283821 | 10/1999 | |

OTHER PUBLICATIONS

Copy of Japanese Examination Report mailed Oct. 1, 2002.
Copy of English translation of Japanese Examination Report mailed Oct. 1, 2002.

* cited by examiner

Primary Examiner—Robert Pascal
Assistant Examiner—Stephen E. Jones
(74) Attorney, Agent, or Firm—Dickstein, Shapiro, Morin & Oshinsky, LLP.

(57) ABSTRACT

As a magnetic material for high frequencies provided in a high-frequency circuit component used as a high-frequency nonreciprocal circuit device, for example, a circulator and an isolator, a magnetic material which can be densely sintered at a relatively low temperature and has a reduced ferromagnetic resonance half width is provided. The magnetic material for high frequencies is primarily composed of yttrium iron-based garnet in which Ca substitutes for a part of Y site, and V substitutes for a part of Fe site, and does not substantially contain tetravalent nor pentavalent elements, other than V, or contains about 0.5% by weight or less of oxide of this element, and the ratio of Ca atoms to V atoms, Ca/V, falls within the range of $2.0<Ca\leq2.4$.

19 Claims, 1 Drawing Sheet

MAGNETIC MATERIAL FOR HIGH FREQUENCIES AND HIGH-FREQUENCY CIRCUIT COMPONENT

BACKGROUND OF THE INVENTION

1. Field of the Invention

The present invention relates to a high frequency magnetic material suitable for constituting a nonreciprocal circuit device for high frequencies, for example, a circulator and an isolator, and to a high-frequency circuit component configured using the magnetic material for high frequencies.

2. Description of the Related Art

By adopting a laminated structure in ceramic electronic components, such as monolithic capacitors and laminated inductors, electronic components can be miniaturized. As a result of miniaturizing the electronic components, electronic equipment configured using the electronic components can also be miniaturized.

The laminated ceramic electronic components are manufactured, generally, by the steps of preparing a plurality of ceramic green sheets, forming internal conductors on specified ceramic green sheets by screen printing, vapor deposition, etc., laminating these ceramic green sheets, and baking the resulting green laminate.

In the laminated ceramic electronic components produced by the aforementioned manufacturing method, the ceramic material must sinter at a temperature equivalent to, or lower than, the melting points of the used internal conductor materials since the ceramic material is baked at the same time with the internal conductors.

In the area of communication equipment, radio communication apparatuses have been miniaturized in recent years, and available frequency bandwidth has been increased. Therefore, requirements for miniaturization, increase in bandwidth, cost reduction, etc., of circuit components used in this area have intensified.

As typical high-frequency circuit components used in the aforementioned area of the communication equipment, for example, high-frequency nonreciprocal circuit devices, such as circulators and isolators, are mentioned. The aforementioned nonreciprocal circuit device is primarily composed of a plurality of central conductors insulated from each other and arranged to intersect with each other, a magnetic material for high frequencies arranged intimately contacting with the central conductors, and a permanent magnet applying a direct current magnetic field to the central conductors and the magnetic material for high frequencies. Each of these constituents is produced as an independent component, and is subjected to use in combination with other components.

In order to meet the aforementioned requirements for miniaturization, increase in bandwidth, cost reduction, etc. of the aforementioned high-frequency nonreciprocal circuit devices, it has been suggested to produce the magnetic material for high frequencies and the central conductors by integral sintering instead of producing each of the components independently, as described in, for example, Japanese Unexamined Patent Application Publication No. 6-61708. In this publication, also described is the use of palladium or platinum as the material for the central conductor.

In the high-frequency nonreciprocal circuit devices produced by the aforementioned integral sintering, for example, a Ca—V-based garnet material is used as the magnetic material for high frequencies. This Ca—V-based garnet material must be baked at a temperature of 1,300° C. or more in order to produce a dense sintered material. When the temperature is lower than this, sufficient sintering density cannot be achieved and this causes problems in that the ferromagnetic resonance half width becomes large and many pores are present.

Palladium or platinum has the advantages of a high melting point of 1,300° C. or more, and ease of integral sintering with the magnetic material for high frequencies made of Ca—V-based garnet material. However, it has a disadvantage of high resistivity, so that, for example, the insertion loss becomes large in the use for a laminated isolator device.

In order to solve the aforementioned problem, it has also been suggested in, for example, Japanese Unexamined Patent Application Publication No. 7-212108 that the central conductor be composed of, or primarily composed of, silver and the central conductor be integrally sintered with the magnetic material for high frequencies.

However, since silver has a low melting point of 961° C., the magnetic material for high frequencies must be sintered at a low temperature equivalent to, or less than, the melting point of silver or the conductor primarily composed of silver. When the magnetic material for high frequencies is not sufficiently sintered, a material having a small loss cannot be produced due to its low density.

In order to achieve sufficient sinterability in concurrent baking with silver or the conductor primarily composed of silver, for example, a Bi—Ca—V-based garnet material in which Bi is added to a Ca—V-based garnet material, may be used as a magnetic material for high frequencies which can be sintered at a low temperature of 1,000° C. or less, and low softening point glass may be added to a magnetic material for high frequencies, although in these cases, a magnetic material for high frequencies having a small loss cannot be produced due to generation of different phases, etc.

SUMMARY OF THE INVENTION

Accordingly, it is an object of the present invention to provide a magnetic material for high frequencies and a high-frequency circuit component configured using this magnetic material for high frequencies, which can solve the aforementioned problems.

In order to solve the aforementioned technical problems, according to an aspect of the present invention, a magnetic material for high frequencies primarily composed of yttrium iron-based garnet, in which calcium (Ca) substitutes for a part of yttrium (Y) site, and vanadium substitutes for a part of iron (Fe) site, is provided, wherein 0% to about 0.5% by weight of oxide of tetravalent or pentavalent element, other than V, is present, and the ratio of Ca atoms to V atoms, Ca/V, falls within the range of $2.0 < Ca/V \leq 2.4$.

In the magnetic material for high frequencies according to the present invention, at least one of bismuth (Bi) and gadolinium (Gd) may substitute for a part of Y site, at least one of aluminum (Al) and indium (In) may substitute for a part of Fe site, or the aforementioned substitutions of both sites may be performed.

The magnetic material for high frequencies according to the present invention is preferably produced by baking at a temperature of 1,100° C. or less.

According to another aspect of the present invention, a high-frequency circuit component configured using the aforementioned magnetic material for high frequencies is provided.

The high-frequency circuit component is provided with a plurality of central conductors insulated from each other and arranged to intersect with each other and a magnetic material for high frequencies arranged intimately contacting with the central conductors. This magnetic material for high frequencies is composed of the aforementioned magnetic material for high frequencies according to the present invention. The central conductors and the magnetic material for high frequencies are integrally sintered, and a direct current magnetic field is applied to the central conductors and the magnetic material for high frequencies by a permanent magnet.

The high-frequency circuit component according to the present invention is preferably a high-frequency nonreciprocal circuit device.

DESCRIPTION OF PREFERRED EMBODIMENTS

Figure 1:
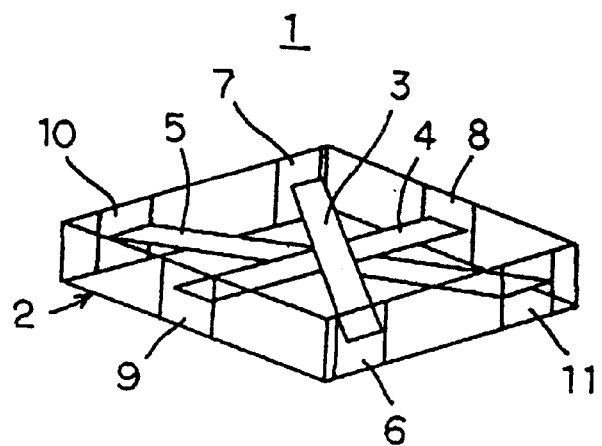
FIG. 1 is a perspective view of a high-frequency circuit component according to an embodiment of the present invention showing a visualized internal structure thereof.

FIG. 1 is a perspective view of a high-frequency circuit component 1 according to an embodiment of the present invention. FIG. 1 shows a visualized internal structure of the high-frequency circuit component 1.

The high-frequency circuit component 1 is to constitute a high-frequency nonreciprocal circuit device, for example, a circulator and an isolator, and is provided with a magnetic material for high frequencies 2 composed of a laminate having a structure in which a plurality of magnetic layers are laminated. In the inside of the magnetic material for high frequencies 2, a plurality of central conductors 3, 4 and 5, insulated from each other and arranged intersecting with each other (i.e., they are on paths which would intersect if projected on a common plane), are buried. More specifically, the central conductors 3 to 5 are formed along specified interfaces among a plurality of magnetic layers constituting the magnetic material for high frequencies 2.

A plurality of external electrodes 6 to 11 are formed on the external surface of the magnetic material for high frequencies 2. Each of the end faces of the central conductors 3 is connected to external electrodes 6 and 7, respectively, each of the end faces of the central conductors 4 is connected to external electrodes 8 and 9, respectively, and each of the end faces of the central conductors 5 is connected to external electrodes 10 and 11, respectively.

The aforementioned external electrodes 6 and 10 are used for connecting to capacity for matching and to external input and output terminals. The external electrode 8 is used for connecting to capacity for matching, and when this high-frequency circuit component 1 constitutes an isolator, a resistance is connected thereto. The external electrodes 7, 9 and 11 are used for connecting to external ground terminals.

As described above, the high-frequency circuit component 1 provides a closed magnetic circuit structure.

Figure 2:
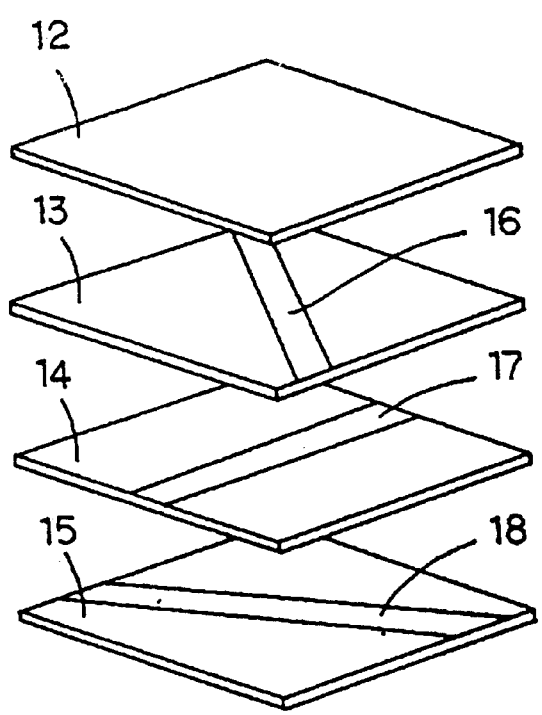
FIG. 2 is a perspective exploded view of a plurality of green sheets 12 to 15 of the magnetic material for high frequencies prepared for producing the high-frequency circuit component as shown in FIG. 1.

In order to produce the aforementioned high-frequency circuit component 1, a plurality of green sheets 12 to 15 of the magnetic material for high frequencies as shown in FIG. 2 are prepared. The green sheets 12 to 15 of the magnetic material for high frequencies have characteristic compositions as described below, and these green sheets are preferably produced by shaping a slurry, produced by adding a binder and an organic solvent to a powder of a magnetic material for high frequencies which can be sintered at 1,100° C. or less, into sheets by, for example, the doctor blade method.

On the specified green sheets 13, 14 and 15 of the magnetic material for high frequencies, conductive paste films 16, 17 and 18, which are to become the aforementioned central conductors 3, 4 and 5, are formed, respectively, by, for example, screen printing.

Then, as shown in FIG. 2, the green sheets 13, 14 and 15 of the magnetic material for high frequencies on which the conductive paste films 16 to 18 are formed and a green sheet 12 of the magnetic material for high frequencies on which no conductive paste film is formed are laminated and pressure-bonded. The resulting green laminate is baked. Consequently, the green sheets 12 to 15 of the magnetic material for high frequencies are sintered so as to become the magnetic material for high frequencies 2, and the conductive paste films 16 to 18 are sintered so as to become the central conductors 3 to 5. As a result, the magnetic material for high frequencies 2 and the central conductors 3 to 5 are integrally sintered. In order to form the external electrodes 6 to 11 on the external surface of the magnetic material for high frequencies 2, for example, printing and baking of a conductive paste containing silver powder and glass frit are performed.

When the high-frequency circuit component 1 produced as described above is used as a microwave nonreciprocal circuit device, for example, a circulator and an isolator, it is combined with the central conductors 3 to 5 and a permanent magnet, although not shown in the drawing, for applying a direct current magnetic field to the magnetic material for high frequencies 2.

As a material for the aforementioned magnetic material for high frequencies 2, a material primarily composed of the aforementioned yttrium iron-based garnet, having a ratio of Ca atoms to V atoms, Ca/V, falling within the range of $2.0 < Ca/V \leq 2.4$, and containing 0% to about 0.5% by weight of an oxide of a tetravalent or pentavalent element, other than V, is used.

The reasons the range of the ratio of Ca atoms to V atoms, Ca/V, is specified as being $2.0 < Ca/V \leq 2.4$ are that when the quantity of Ca is excessively small, that is, $Ca/V \leq 2.0$, the sintering temperature for producing the magnetic material for high frequencies 2 is not reduced, so that sintering must be performed at 1,300° C. or more in a manner similar to that in the conventional Ca—V-based yttrium iron garnet material, and on the other hand, when the quantity of Ca is excessively large, that is, $Ca/V > 2.4$, the sintering temperature for producing the magnetic material for high frequencies 2 is reduced but different phases are generated due to the excess Ca, so that the ferromagnetic resonance half width becomes large.

When the range of Ca/V is $2.0 < Ca/V \leq 2.4$, it is difficult for characteristics, such as saturation magnetization and Curie temperature, to take on various values. However, by substituting at least one of bismuth (Bi) and gadolinium (Gd) for a part of Y site, by substituting at least one of aluminum (Al) and indium (In) for a part of Fe site, or by performing substitutions of both sites, characteristics, such as the saturation magnetization and the Curie temperature, can be controlled without degradation of low temperature sintering effect. Therefore the aforementioned substitutions are effective in the magnetic material for high frequencies 2 provided in the high-frequency circuit component 1 in order to realize various characteristics.

Since the magnetic material for high frequencies 2 having the aforementioned specified composition can be densely sintered at a low temperature of 1,100° C. or less, an energy saving effect during baking can be expected, and in the aforementioned central conductors 3 to 5, a metal primarily composed of silver, gold, etc., can be used.

A specified embodiment of the magnetic material for high frequencies 2 according to the present invention will be explained below using examples.

EXAMPLES

In these examples, as a Ca—V-substituted yttrium iron-based garnet material to become a magnetic material for high frequencies, a known $(Ca,Y)_3(Fe,V)_5O_{12}$-based material was used. See, for example, Carl E. Patton "Effective Linewidth due to Porosity and Anisotropy in Polycrystalline Yttrium Iron Garnet and Ca—V-Substituted Yttrium Iron Garnet at 10 GHz" Phys. Rev., vol.179, No.2 (1969).

As starting materials, each powder of $CaCO_3$, $Y_2O_3$, $Fe_2O_3$, $V_2O_5$, $Al_2O_3$ and $In_2O_3$, each had a purity of 99% or more, was prepared.

These material powders were blended in order to have compositions represented by a chemical formula $Ca_{x+v}Y_{3-x+v}Fe_{5-v}V_vO_w$ or to have compositions represented by a chemical formula $Ca_{x+v}Y_{3-x+v}Fe_{5-v-a-i}V_vAl_aIn_iO_w$ corresponding to the aforementioned chemical formula in which at least one of Al and In substitutes for a part of Fe site, as shown in Table 1 and Table 2.

Each of these blended material powders was dry-mixed in a ball mill, and thereafter was calcined. Subsequently, a binder was added to the resulting calcined powder, and drying, granulation and pressure molding were performed so as to mold into a disk compact of 8 mm in diameter and 1 mm in thickness.

In Samples 1 to 22 as shown in Table 1, $ZrO_2$ as an oxide of a tetravalent element is not added to the material powder, and Samples to which $ZrO_2$ was added in different addition quantities are shown in Table 2.

The aforementioned compacts were baked at various temperatures for 5 hours so as to produce sintered materials as magnetic materials for high frequencies.

Regarding the resulting magnetic materials for high frequencies, densities were determined by Archimedes' method and relative densities (%) were calculated relative to theoretical densities. Ferromagnetic resonance half widths, which were indicators of losses in the case where magnetic materials for high frequencies were used as isolator devices, were measured with a network analyzer. The results thereof are shown in Table 1 and Table 2.

In Table 1 and Table 2, "Baking Temperature" indicates the baking temperature at which ferromagnetic resonance half width of 4 kA/m or less can be achieved, this being effective when the magnetic material for high frequencies is used as an isolator device. In Table 1 and Table 2, the mark "x" in the column "Baking Temperature" indicates that ferromagnetic resonance half widths did not become 4 kA/m or less at any baking temperatures.

In each of columns "Relative Density" and "Ferromagnetic Resonance Half Width" in Table 1, the parenthesized values indicate the values when baking was performed at 1,100° C.

In Table 1 and Table 2, asterisked sample numbers indicate the samples which are out of the scope of the present invention.

TABLE 1

| Sample No. | Composition: $Ca_{x+v}Y_{3-x+v}Fe_{5-v-a-i}V_vAl_aIn_iO_w$ | | | | | $ZrO_2$ Addition Quantity (wt %) | Baking Temperature (° C.) | Relative Density (%) | Ferromagnetic Resonance Half Width (kA/m) |
|---|---|---|---|---|---|---|---|---|---|
| | x | v | a | i | w | | | | |
| *1 | 2.00 | 0.30 | 0.00 | 0.00 | 12.00 | 0.0 | 1360 | 98 | 2.23 |
| 2 | 2.05 | | | | 11.99 | | 1100 | 98 | 3.42 |
| 3 | 2.10 | | | | 11.99 | | 1100 | 98 | 2.78 |
| 4 | 2.15 | | | | 11.98 | | 1100 | 98 | 2.39 |
| 5 | 2.20 | | | | 11.97 | | 1100 | 98 | 2.23 |
| 6 | 2.25 | | | | 11.96 | | 1100 | 98 | 2.47 |
| 7 | 2.30 | | | | 11.96 | | 1100 | 98 | 2.70 |
| 8 | 2.35 | | | | 11.95 | | 1100 | 98 | 3.02 |
| 9 | 2.40 | | | | 11.94 | | 1100 | 98 | 3.58 |
| *10 | 2.45 | | | | 11.93 | | x | (98) | (4.69) |
| *11 | 2.50 | | | | 11.93 | | x | (98) | (6.36) |
| *12 | 2.00 | 0.40 | 0.30 | 0.20 | 12.00 | 0.0 | 1360 | 98 | 1.75 |
| 13 | 2.05 | | | | 11.99 | | 1100 | 98 | 2.31 |
| 14 | 2.10 | | | | 11.98 | | 1100 | 98 | 1.99 |
| 15 | 2.15 | | | | 11.97 | | 1100 | 96 | 1.67 |
| 16 | 2.20 | | | | 11.96 | | 1100 | 98 | 1.59 |
| 17 | 2.25 | | | | 11.95 | | 1100 | 98 | 1.83 |
| 18 | 2.30 | | | | 11.94 | | 1100 | 97 | 2.07 |
| 19 | 2.35 | | | | 11.93 | | 1100 | 98 | 2.39 |
| 20 | 2.40 | | | | 11.92 | | 1100 | 98 | 2.94 |
| *21 | 2.45 | | | | 11.91 | | x | (98) | (4.06) |
| *22 | 2.50 | | | | 11.90 | | x | (98) | (5.33) |

As shown in Table 1, Samples 2 to 9 and 13 to 20, yttrium iron-based garnet materials having a composition of $Ca_{x+v}Y_{3-x+v}Fe_{5-v}V_vO_w$ or $Ca_{x+v}Y_{3-x+v}Fe_{5-v-a-i}V_vAl_aIn_iO_w$ when ratios of Ca atoms to V atoms, Ca/V corresponding to x, fall within the range of $2.0 < Ca/V \leq 2.4$, even at a relatively low temperature of 1,100° C., sufficient sintering densities can be achieved, and magnetic materials for high frequencies having ferromagnetic resonance half widths of 4 kA/m or less can be produced.

On the other hand, when the ratios Ca/V corresponding to x fall within the range of Ca/V≦2.0 as in Samples 1 and 12, in order to make the ferromagnetic resonance half width 4 kA/m or less, the sintering temperature must be 1,300° C. or more, so that it is impossible to reduce the sintering temperature.

When the ratios Ca/V corresponding to x fall within the range of Ca/V>2.4 as in Samples 10, 11, 21 and 22, sintering temperatures are reduced and relative densities of 95% or more can be achieved by baking even at a temperature of 1,100° C., but ferromagnetic resonance half widths do not become 4 kA/m or less by applying any baking temperatures. This is because different phases are generated due to the excess Ca.

As described above, magnetic materials for high frequencies according to the present invention primarily composed of yttrium iron-based garnet can be produced, in which dense sintered state can be achieved at relatively low temperature of 1,100° C. or less and ferromagnetic resonance half widths of 4 kA/m or less can be achieved.

Therefore, when the magnetic material for high frequencies according to the present invention is used as the aforementioned magnetic material for high frequencies in a high-frequency circuit component, for example, a high-frequency nonreciprocal circuit device, provided with a plurality of central conductors insulated from each other and arranged intersecting with each other and a magnetic material for high frequencies arranged intimately contacting with

TABLE 2

| Sample No. | Composition: $Ca_{x+v}Y_{3-x+v}Fe_{3-v-a-i}V_vAl_aIn_iO_w$ | | | | | $ZrO_2$ Addition Quantity (wt %) | Baking Temperature (° C.) | Relative Density (%) | Ferromagnetic Resonance Half Width (kA/m) |
|---|---|---|---|---|---|---|---|---|---|
| | x | v | a | i | w | | | | |
| 23 | 2.05 | 0.30 | 0.00 | 0.00 | 11.99 | 0.00 | 1100 | 98 | 3.42 |
| 24 | 2.05 | | | | 11.99 | 0.25 | 1100 | 98 | 3.50 |
| 25 | 2.05 | | | | 11.99 | 0.50 | 1100 | 98 | 3.66 |
| *26 | 2.05 | | | | 11.99 | 0.75 | x | (97) | (4.30) |
| *27 | 2.05 | | | | 11.99 | 1.00 | x | (98) | (6.84) |
| 28 | 2.20 | 0.30 | 0.00 | 0.00 | 11.97 | 0.00 | 1100 | 98 | 2.23 |
| 29 | 2.20 | | | | 11.97 | 0.25 | 1100 | 98 | 2.31 |
| 30 | 2.20 | | | | 11.97 | 0.50 | 1100 | 98 | 2.55 |
| *31 | 2.20 | | | | 11.97 | 0.75 | x | (98) | (4.06) |
| *32 | 2.20 | | | | 11.97 | 1.00 | x | (98) | (6.76) |
| 33 | 2.40 | 0.30 | 0.00 | 0.00 | 11.94 | 0.00 | 1100 | 98 | 3.58 |
| 34 | 2.40 | | | | 11.94 | 0.25 | 1100 | 98 | 3.66 |
| 35 | 2.40 | | | | 11.94 | 0.50 | 1100 | 98 | 3.82 |
| *36 | 2.40 | | | | 11.94 | 0.75 | x | (98) | (4.46) |
| *37 | 2.40 | | | | 11.94 | 1.00 | x | (98) | (7.00) |

As shown in Table 2, Samples 23 to 25, 28 to 30, and 33 to 35, in yttrium iron-based garnet materials having a composition of $Ca_{x+v}Y_{3-x+v}Fe_{5-v}V_vO_w$ or $Ca_{x+v}Y_{3-x+v}Fe_{5-v-a-i}V_vAl_aIn_iO_w$, when ratios Ca/V corresponding to x fall within the range of 2.0<Ca/V≦2.4, and $ZrO_2$ addition quantities are within the range of 0 to about 0.50% by weight, even at a relatively low temperature of 1,100° C., sufficient sintering densities can be achieved, and ferromagnetic resonance half widths of 4 kA/m or less can be achieved.

On the other hand, when the $ZrO_2$ addition quantities exceed about 0.5% by weight as in Samples 26, 27, 31, 32, 36 and 37, sintering can be performed at relatively low temperatures but ferromagnetic resonance half widths of 4 kA/m or less cannot be achieved at any baking temperatures due to generation of different phases according to $ZrO_2$.

In the aforementioned examples, evaluations were performed only regarding a material system in which no element, other than Ca, substituted for a part of Y site, or a material system in which $ZrO_2$ was added to the material system in which no element, other than Ca, substituted for a part of Y site. In addition, it was confirmed that even when elements such as Bi and Gd, substituted for a part of Y site, and even when elements, such as Bi and Gd, substituted for a part of Y site, while elements such as Al and In, substituted for a part of Fe site, effects similar to those in the above description can be achieved as long as the ratio Ca/V falls within the range of 2.0<Ca/v≦2.4, and the content of an oxide of tetravalent or pentavalent element, other than V and Zr, is about 0.5% by weight or less.

the central conductors, in which the central conductors and the magnetic material for high frequencies are integrally sintered, a high-frequency circuit component having a small loss and high quality can be produced.

What is claimed is:

1. A magnetic material for high frequencies comprising yttrium iron-based garnet in which calcium (Ca) substitutes for a part of yttrium (Y) site and vanadium (V) substitutes for a part of iron (Fe) site, wherein:
   an oxide of Zr or Bi is present in a positive amount up to about 0.5% by weight; and
   the ratio of Ca atoms to V atoms is 2.0<Ca/V≦2.4.

2. A magnetic material for high frequencies according to claim 1, in which Zr is present.

3. A high-frequency circuit component, comprising:
   an integrally sintered combination of a plurality of central conductors insulated from each other and arranged on paths which would intersect if projected on a common plane; and a magnetic material for high frequencies according to claim 2 arranged intimately contacting said central conductors; and
   a permanent magnet arranged to apply a direct current magnetic field to said central conductors and said magnetic material for high frequencies.

4. A high-frequency nonreciprocal circuit device according to claim 3.

5. Amended A magnetic material for high frequencies according to claim 1, in which bismuth (Bi) is present.

6. A magnetic material for high frequencies according to claim 5, wherein at least one of aluminum (Al) and indium (In) substitutes for a part of Fe site.

7. A magnetic material for high frequencies according to claim 1, wherein at least one of aluminum (Al) and indium (In) substitutes for a part of Fe site.

8. A magnetic material for high frequencies according to claim 1, which has been baked at a temperature of 1,100° C. or less.

9. A high-frequency circuit component, comprising:

an integrally sintered combination of a plurality of central conductors insulated from each other and arranged on paths which would intersect if projected on a common plane; and a magnetic material for high frequencies according to claim 1 arranged intimately contacting said central conductors; and a permanent magnet arranged to apply a direct current magnetic field to said central conductors and said magnetic material for high frequencies.

10. A high-frequency nonreciprocal circuit device according to claim 9.

11. A magnetic material for high frequencies comprising yttrium iron-based garnet in which calcium (Ca) substitutes for a part of yttrium (Y) site and vanadium (V) substitutes for a part of iron (Fe) site, wherein:

an oxide of a tetravalent or pentavalent element other than V is not present; and the ratio of Ca atoms to V atoms is $2.0 < Ca/V \leq 2.4$.

12. A magnetic material for high frequencies according to claim 11, which has been baked at a temperature of 1,100° C. or less.

13. Amended A high-frequency circuit component, comprising:

an integrally sintered combination of a plurality of central conductors insulated from each other and arranged intersecting with each other; and a magnetic material for high frequencies according to claim 11 arranged intimately contacting said central conductors; and a permanent magnet arranged to apply a direct current magnetic field to said central conductors and said magnetic material for high frequencies.

14. A high-frequency nonreciprocal circuit device according to claim 13.

15. A magnetic material for high frequencies according to claim 11, wherein at least one of aluminum (Al) and indium (In) substitutes for a part of Fe site.

16. A magnetic material for high frequencies according to claim 11, wherein gadolinium (Gd) substitutes for a part of Y site.

17. A high-frequency circuit component, comprising:

an integrally sintered combination of a plurality of central conductors insulated from each other and arranged on paths which would intersect if projected on a common plane; and a magnetic material for high frequencies according to claim 16 arranged intimately contacting said central conductors; and a permanent magnet arranged to apply a direct current magnetic field to said central conductors and said magnetic material for high frequencies.

18. A high-frequency nonreciprocal circuit device according to claim 17.

19. A magnetic material for high frequencies according to claim 16, wherein at least one of aluminum (Al) and indium (In) substitutes for a part of Fe site.

* * * * *